United States Patent
Bender

(10) Patent No.: US 9,466,958 B2
(45) Date of Patent: Oct. 11, 2016

(54) CONDUIT END WITH DEMARCATION

(71) Applicant: O'KOTE INC., Santa Paula, CA (US)

(72) Inventor: Ilan Bender, Encino, CA (US)

(73) Assignee: O'KOTE INC., Santa Paula, CA (US)

( * ) Notice: Subject to any disclaimer, the term of this patent is extended or adjusted under 35 U.S.C. 154(b) by 18 days.

(21) Appl. No.: 14/591,563

(22) Filed: Jan. 7, 2015

(65) Prior Publication Data

US 2016/0195206 A1    Jul. 7, 2016

(51) Int. Cl.
*F16L 9/147*    (2006.01)
*H02G 3/04*    (2006.01)

(52) U.S. Cl.
CPC ...................... *H02G 3/04* (2013.01)

(58) Field of Classification Search
CPC .. G09F 3/205; G09F 3/0295; F16L 2201/10; F16L 9/147; F16L 2201/60
USPC .......................................................... 285/93
See application file for complete search history.

(56) References Cited

U.S. PATENT DOCUMENTS

| 4,046,387 A * | 9/1977 | Lee ...................... F16J 15/3296 250/370.11 |
| 5,390,964 A * | 2/1995 | Gray, Jr. ............. B29C 61/0608 138/104 |
| 7,543,359 B2 * | 6/2009 | Moughelbay .......... A01G 17/12 24/16 PB |

OTHER PUBLICATIONS

Mayer Electric Supply Robroy PVC Coated Conduit, https://www.meyerelectric.com/itemdetailfilterPH.action?codeId=1203127, 2012.*

* cited by examiner

*Primary Examiner* — Rodney Mintz
*Assistant Examiner* — Daniel Kenny
(74) *Attorney, Agent, or Firm* — AEON Law; Adam L. K. Philipp

(57) ABSTRACT

A coated conduit end with a perceivable demarcation quickly and reliably indicates how far conduit is screwed or inserted into a coated conduit fitting to form a conduit system.

20 Claims, 12 Drawing Sheets

CONDUIT END WITH DEMARCATION

FIELD

This disclosure relates to conduits and, more specifically, to coated electrical conduits.

BACKGROUND

Conduit and electrical conduit are tubing systems used to protect and route wiring, electrical wiring, communications wiring, and the like. Conduit may be made of metal (including iron, steel, galvanized steel, stainless steel, aluminum, bronze, and brass), plastic polymer, fiber, fired clay, and composite materials. Types of conduit include rigid metal conduit, galvanized rigid conduit, intermediate metal conduit, electrical metallic tubing, aluminum conduit, rigid nonmetallic conduit, electrical nonmetallic tubing, flexible metallic conduit, liquid-tight flexible metal conduit, flexible metallic tubing, and liquid-tight flexible nonmetallic conduit.

By way of example, conduit may comprise a metal core which is coated (potentially on both interior and exterior sides) with a corrosion resistant material, such as zinc or polyurethane. Such corrosion resistant material shall be referred to herein as "thin protective coat". A protective layer, such as polyvinyl chloride ("PVC") or another plastic or a polymer, may be applied to the exterior of the conduit, such as by coating the metal core (which may have also received a thin protective coat) in PVC. This protective layer is referred to herein as "external coating". A conduit with an external coating is referred to herein as "coated conduit".

Conduit may be unthreaded or threaded. A typical piece of threaded conduit comprises at least one male threaded end, which male threaded end is suitable to be screwed into a female threaded conduit fitting or box connector.

As used herein, "conduit fitting" shall be used to refer to "couplings", "conduit bodies", and "box connectors". Couplings join two pieces of conduit together via threaded or slip connectors, into which the conduit screws or is otherwise inserted and secured. Conduit bodies join two or more pieces of conduit together via threaded or slip connectors and have an access cover to allow access to the interior of the conduit body. The access cover may be disconnected from the conduit body to expose a cavity and allow wiring or the like to be pulled through conduit which is secured to at least one side of the conduit body. When the wiring is pulled through, the access cover may then being re-connected to the conduit body to cover the cavity. Types of conduit bodies include L-shaped bodies (also referred to as "Ells"), T-shaped bodies ("Tees"), C-shaped bodies ("Cees"), and Service Ell bodies ("SLBs"). Box connectors are structures used to secure conduit to a junction box or other electrical box via a threaded connection or a compression fitting (which may be part of the box connector or may involve additional components). In the case of conduit fittings with threaded connectors, the threaded connector is typically a female receptacle which receives the male threaded conduit end.

As with conduits, conduit fittings may be coated in PVC or another plastic polymer external coating. Conduit fittings with an external coating shall be referred to herein as "coated conduit fittings". A coated conduit fitting may comprise a sleeve at the location of the female threaded receptacle in the fitting; conduit, generally coated conduit, fits into the sleeve and may be screwed into or otherwise may be secured to the female receptacle in the coated conduit fitting. The sleeve of a coated conduit fitting generally accommodates the conduit with a tight fit which may require expansion of the sleeve. When external coating is applied to a conduit, the external coating is often applied by a party other than the party who manufactured the conduit. When external coating is applied to a conduit, markings, if any, on the conduit are frequently covered by the external coating.

As used herein, a "conduit system" comprises at least one conduit and at least one conduit fitting.

Electrical conduit systems are often installed by electricians, service professionals, and construction laborers. The installation is often in difficult to access areas of structures, attics, drop ceilings, false floors, crawl spaces, concrete structures (in which the conduit may be embedded), beams, or in underground locations such as duct banks, utility tunnels, or trenches in the ground. The conduit is often left in place for years and is subject to moisture, corrosive environmental conditions, decay and movement of the surrounding building or environment, plant and animal life, and other disturbances. For these reasons and because the conduit may protect critical infrastructure, care should be taken when conduit is installed.

Commonly, and particularly for electrical conduit systems, the conduit system must be inspected by parties such as engineers and building or construction inspectors; inspectors may have professional or governmental obligations to perform a careful inspection and to note deficiencies relative to required or desired objectives. An element in such inspections may be whether, in a conduit system, conduit has been adequately secured into conduit fittings. In the case of coated conduit fittings, the sleeve may obscure the connection site, making it difficult or impossible to tell whether the conduit has been completely screwed or inserted into the conduit fitting. In addition, the cramped, awkward, and often inaccessible or not easily viewed location of the conduit system may further make it difficult to inspect the conduit system.

Disclosed is a coated conduit end with a perceivable demarcation which quickly and reliably indicates how far conduit is screwed or inserted into a coated conduit fitting to form a conduit system.

DETAILED DESCRIPTION

The description of the drawings and the following detailed description refer to the accompanying drawings. The same element number in different drawing figures generally identifies the same or similar elements and/or components. Element numbers followed by an "A" or "B" identify substantially similar components (including components which are mirror images of one another), within conventional manufacturing tolerances; when written without the "A" or "B," the element number shall refer to either such component. If the drawings are viewed one entire page at a time, and if the pages are flipped up or down one entire page at a time, then certain of the Figures are arranged to show components come and go with the page change.

This Detailed Description section provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

As used herein, "releasable," "connect," "connected," "connectable," "disconnect," "disconnected," and "disconnectable" refers to two or more structures which may be connected or disconnected, generally without the use of tools (examples of tools including screwdrivers, pliers, drills, saws, welding machines, torches, irons, and other heat sources) and generally in a repeatable manner. As used herein, "attach," "attached," or "attachable" refers to two or more structures or components which are attached through the use of tools or chemical or physical bonding. As used herein, "secure," "secured," or "securable" refers to two or more structures or components which are either connected or attached.

Figure 1A:
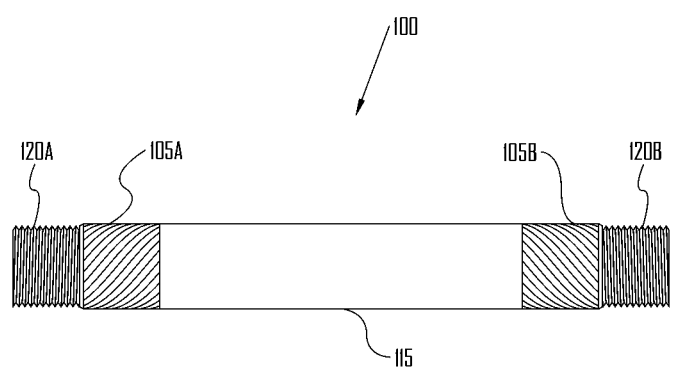
FIG. 1A is a side elevation view of a coated conduit with a demarcation.
Figure 11A:
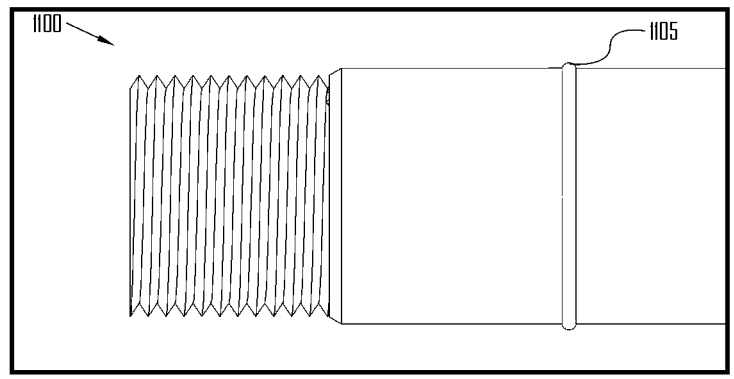
FIG. 11A is a close side elevation view of a coated conduit end, illustrating another example of a demarcation.
Figure 11B:
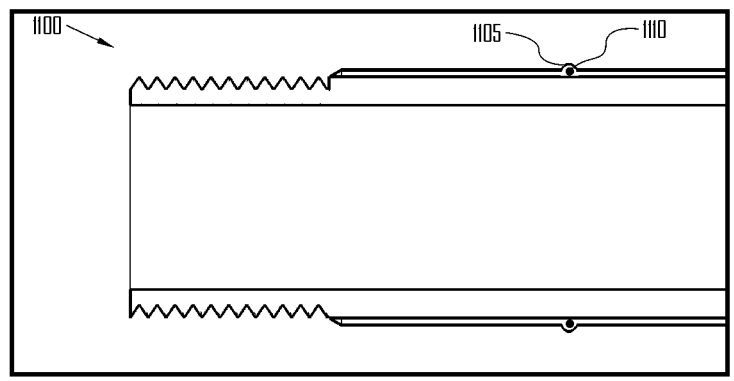
FIG. 11B is a close side elevation view of the coated conduit end of FIG. 11A, with a section cut along the centerline of the coated conduit end.

Referring to FIG. 1A, Coated Conduit 100 comprises Threaded Male Portions 120A and 120B. Areas of Coated Conduit 100 which are not threaded are coated with an external coating which may be, for example, PVC or another polymer. Diagonal lines in Sleeve Covered Areas 105A and 105B indicate a perceivable demarcation relative to Non-Sleeve Covered Area 115. The perceivable demarcation may be provided by, for example, different colors or materials applied to or present in the external coating. For example, Sleeve Covered Areas 105A and 105B may be a first color, while Non-Sleeve Covered Area 115 is a second color. The perceivable demarcation may be a tactile difference, as may be produced by different materials or a relief pattern in the external coating. A tactile difference may aid in identification of the perceivable demarcation when visual inspection is not possible. An example of a tactile difference is illustrated in FIGS. 11A and 11B.

Figure 1B:
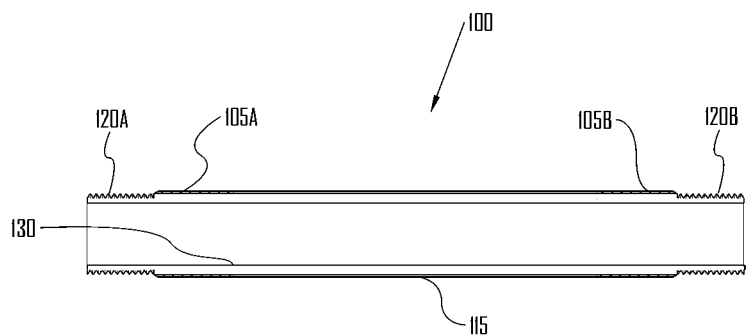
FIG. 1B is a side elevation view of the coated conduit and demarcation of FIG. 1A with a section cut along the centerline of the conduit.

FIG. 1B illustrates Coated Conduit 100 with a section cut along the centerline of Coated Conduit 100. Relative to FIG. 1A, FIG. 1B further illustrates Core 130 within Coated Conduit 100.

Figure 2D:
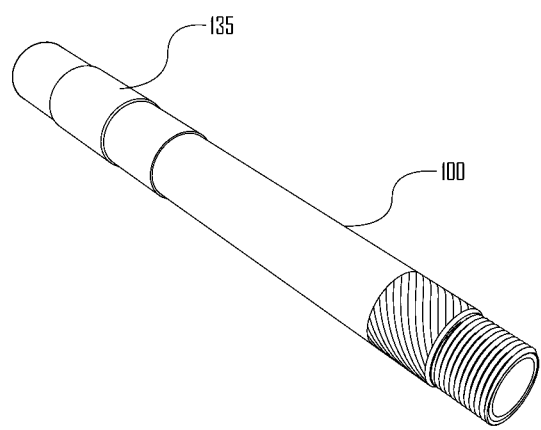
FIG. 2D is an isometric perspective view of the coated conduit and demarcation of FIG. 1C, wherein the coated conduit is secured to a coated conduit fitting.
Figure 2A:
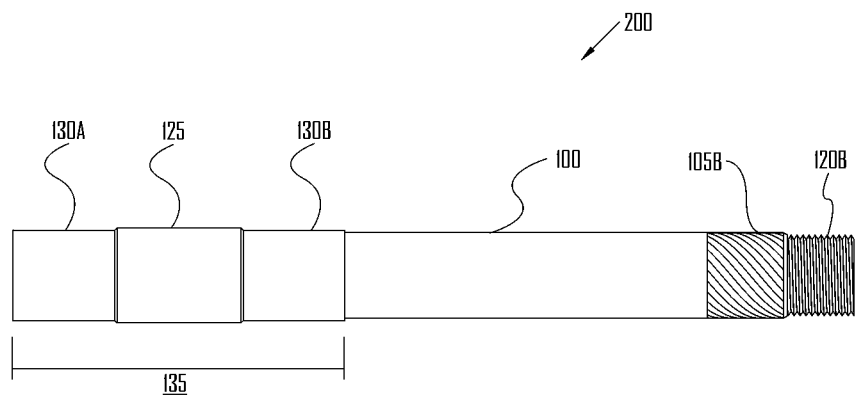
FIG. 2A is a side elevation view of the coated conduit and demarcation of FIG. 1A, wherein the coated conduit is secured to a coated conduit fitting.

FIG. 2A illustrates Coated Conduit and Coated Conduit Fitting 200. In FIG. 2A, Coated Conduit 100 is secured in Coated Conduit Fitting 135. Coated Conduit Fitting 135 comprises Sleeves 130A and 130B. Sleeve 130B covers Sleeve Covered Area 105A, as may be observed by flipping between Drawing Sheet 1 and 2. Sleeve Covered Area 105B and Threaded Male Portion 120B are labeled in FIG. 2A for the sake of clarity.

Figure 2B:
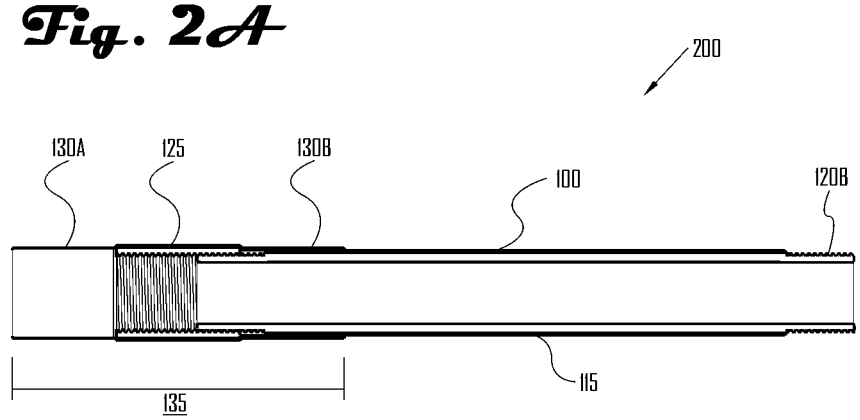
FIG. 2B is a side elevation view of the coated conduit, demarcation, and coated conduit fitting of FIG. 2A, with a section cut along the centerline of the coated conduit and conduit fitting.

FIG. 2B illustrates Coated Conduit and Coated Conduit Fitting 200, with a section cut along the centerline of Coated Conduit 100 and Coated Conduit Fitting 135. FIG. 2B further illustrates how Coated Conduit 100 may be screwed into Coated Conduit Fitting 135 and how Sleeve 130B covers Sleeve Covered Area 105A.

Figure 2C:
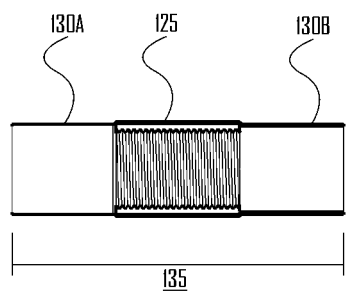
FIG. 2C is a side elevation view of the conduit fitting of FIG. 2A, with a section cut along the centerline of the coated conduit fitting to illustrate the sleeves in the coated conduit fitting.

FIG. 2C is a side elevation view of Coated Conduit Fitting 135, with a section cut along the centerline of Coated Conduit Fitting 135 to illustrate Sleeves 130A and 130B without Coated Conduit 100.

Figure 1C:
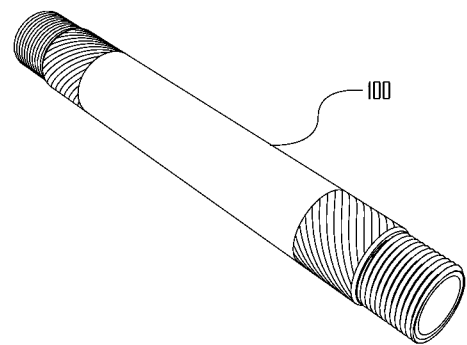
FIG. 1C is an isometric perspective view of a coated conduit with a demarcation.

FIG. 1C is an isometric perspective view of Coated Conduit 100, provided for the sake of illustrating the 3-dimensional shape of Coated Conduit 100.

FIG. 2D is an isometric perspective view of Coated Conduit 100 and Coated Conduit Fitting 135, provided for the sake of illustrating the 3-dimensional shape of Coated Conduit 100 and Coated Conduit Fitting 135.

Figure 3A:
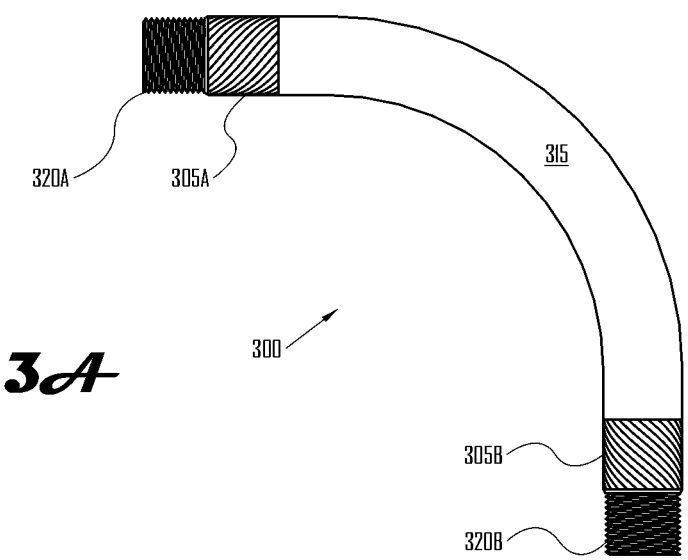
FIG. 3A is a side elevation view of a curved coated conduit with a demarcation.

FIG. 3A is a side elevation view of Curved Coated Conduit 300. As with Coated Conduit 100, Curved Coated Conduit 300 comprises Threaded Male Portions 320A and 320B. Areas of Curved Coated Conduit 300 which are not threaded are coated with an external coating. Diagonal lines in Sleeve Covered Areas 305A and 305B indicate a perceivable demarcation relative to Non-Sleeve Covered Area 315, similar to the perceivable demarcation illustrated in FIG. 1.

Figure 3B:
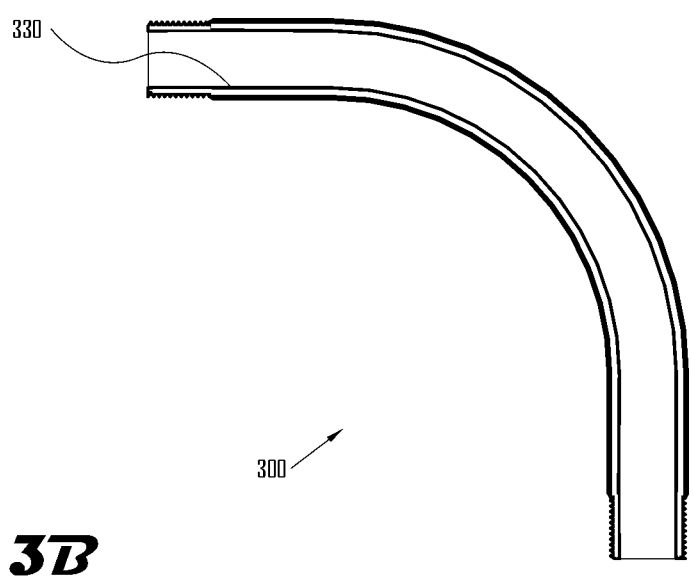
FIG. 3B is a side elevation view of the curved coated conduit and demarcation of FIG. 3A, with a section cut along the centerline of the curved coated conduit.

FIG. 3B is a side elevation view of Curved Coated Conduit 300, with a section cut along the centerline of Curved Coated Conduit 300. Relative to FIG. 3A, FIG. 3B further illustrates Core 330 within Curved Coated Conduit 300.

Figure 4A:
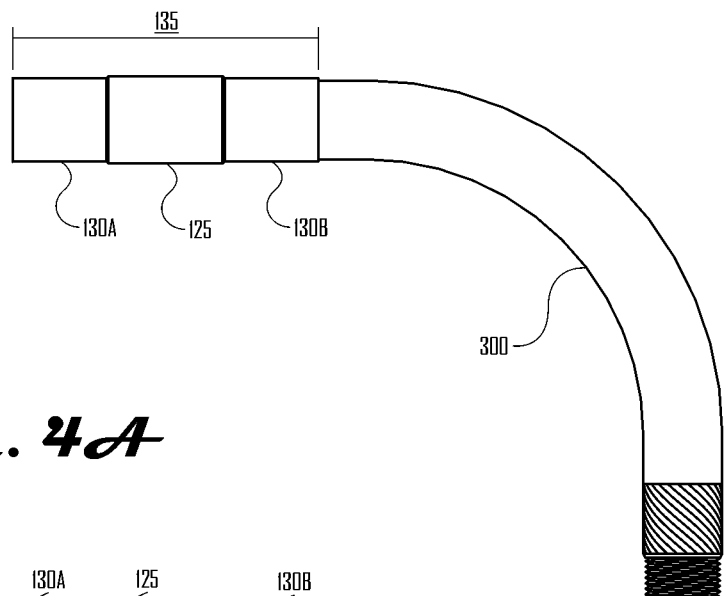
FIG. 4A is a side elevation view of the curved coated conduit and demarcation of FIG. 3A, wherein the curved coated conduit is secured to a coated conduit fitting.

FIG. 4A illustrates Curved Coated Conduit 300 secured in Coated Conduit Fitting 135. As in earlier Figures, Coated Conduit Fitting 135 comprises Sleeves 130A and 130B. Sleeve 130B covers Sleeve Covered Area 305A, as may be observed by flipping between Drawing Sheet 4 and 5.

Figure 4B:
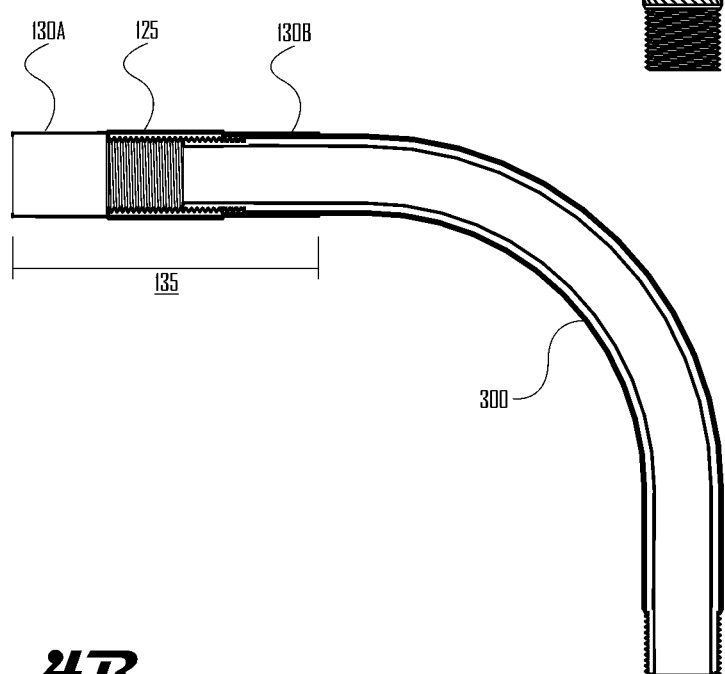
FIG. 4B is a side elevation view of the curved coated conduit, demarcation, and coated conduit fitting of FIG. 4A, with a section cut along the centerline of the conduit and coated conduit fitting.

FIG. 4B illustrates Curved Coated Conduit 300 secured in Coated Conduit Fitting 135, with a section cut along the centerline of Curved Coated Conduit 300 and Coated Conduit Fitting 135. FIG. 4B further illustrates how Curved Coated Conduit 300 may be screwed into Coated Conduit Fitting 135 and how Sleeve 130B covers Sleeve Covered Area 305A.

Figure 5A:
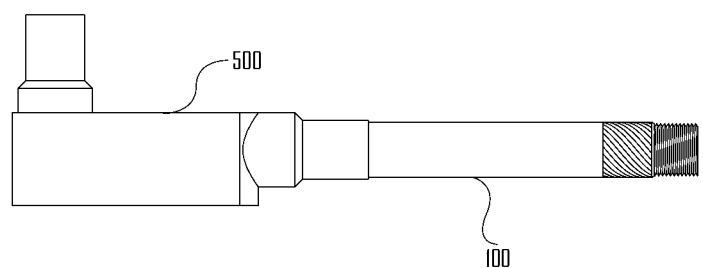
FIG. 5A is a side elevation view of a coated conduit with demarcations, wherein the coated conduit is secured to another example of a coated conduit fitting.

FIG. 5A is a side elevation view of Coated Conduit 100, wherein Coated Conduit 100 is secured to another example of coated conduit fitting, Conduit Body 500.

Figure 5B:
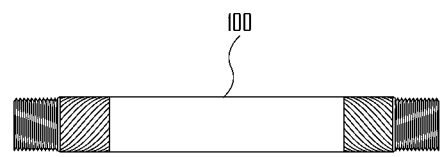
FIG. 5B is a side elevation view of the coated conduit with demarcations of FIG. 5A, without the coated conduit fitting to illustrate how the sleeve of the coated conduit fitting interacts with the demarcations.

FIG. 5B is a side elevation view of Coated Conduit 100, without Conduit Body 500 to illustrate how the sleeve of Conduit Body 500 interacts with the demarcations of Coated Conduit 100.

Figure 6A:
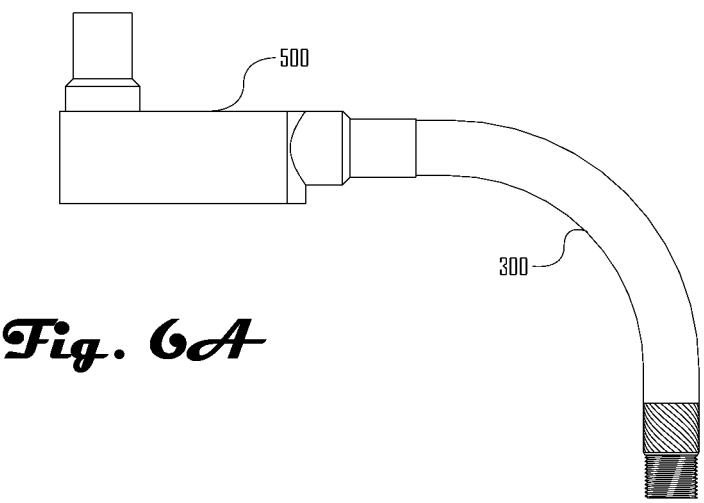
FIG. 6A is a side elevation view of a curved coated conduit with demarcations, wherein the curved coated conduit is secured to another example of a coated conduit fitting.

FIG. 6A is a side elevation view of Curved Coated Conduit 300, wherein Curved Coated Conduit 300 is secured to Conduit Body 500.

Figure 6B:
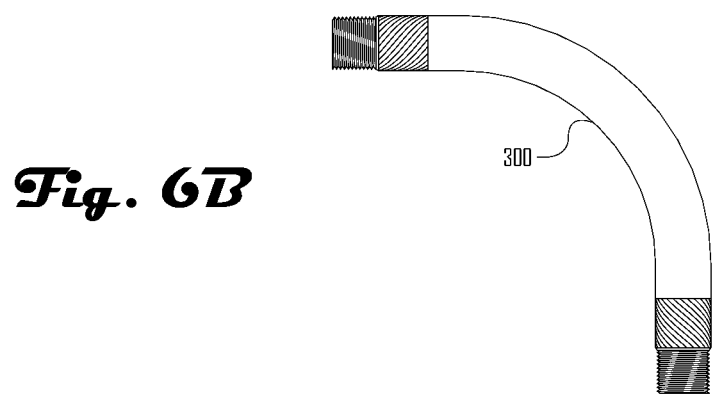
FIG. 6B is a side elevation view of the curved coated conduit and demarcations of FIG. 6A, without the coated conduit fitting to illustrate how the sleeve of the coated conduit fitting interacts with the demarcations.

FIG. 6B is a side elevation view of Curved Coated Conduit 300, without Conduit Body 500 to illustrate how the sleeve of Conduit Body 500 interacts with the demarcations of Curved Coated Conduit 300.

Figure 7A:
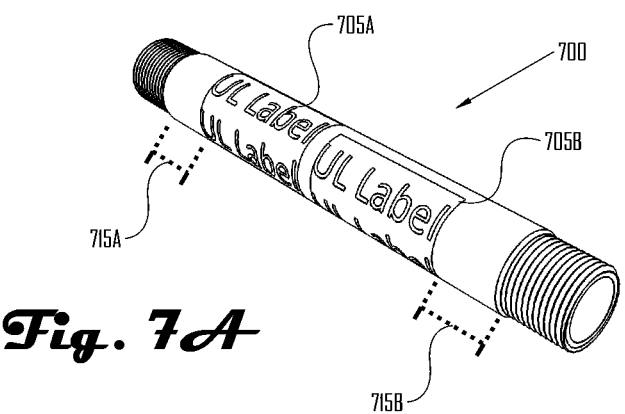
FIG. 7A is an perspective view of a conduit with an example of demarcations created through use of labels.

FIG. 7A is a perspective view of Conduit 700 with an example of demarcations created through use of Labels 705A and 705B, which Labels 705 may be applied to an underlying conduit. Labels 705 demarcate a portion of Conduit 700, Sleeve Covered Portion 715A and 715B, which may be covered by a sleeve of a conduit fitting. Label 705 may indicate conformance to a private or public regulatory standard or testing to a certified level, as, for example, may be performed by a Nationally Recognized Testing Laboratory, such as Underwriters Laboratories or the like.

Figure 7B:
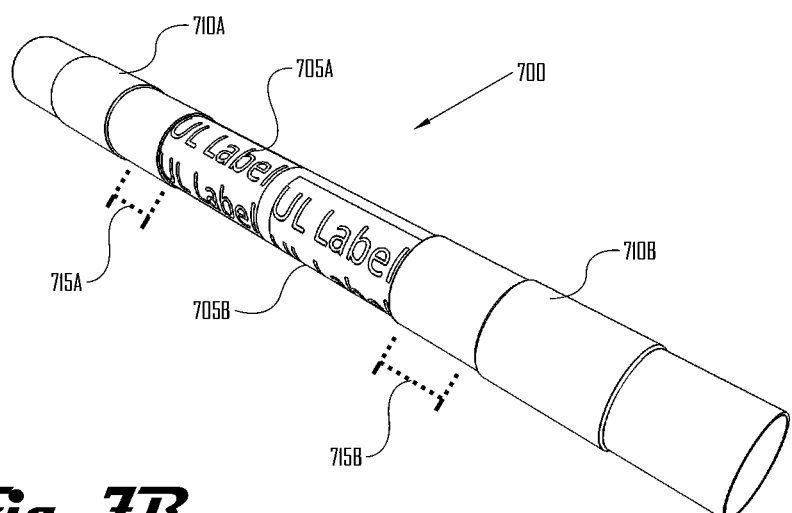
FIG. 7B is an perspective view of the conduit and demarcations of FIG. 7A, further comprising two coated conduit fittings to illustrate how the coated conduit fittings interact with the demarcations.

FIG. 7B is a perspective view of Conduit 700 secured to Coated Conduit Fittings 710A and 710B, illustrating how Sleeve Covered Portions 715A and 715B are covered by the sleeves of Coated Fittings 710A and 710B when Conduit 700 is properly secured to Coated Conduit Fittings 710A and 710B.

Figure 8A:
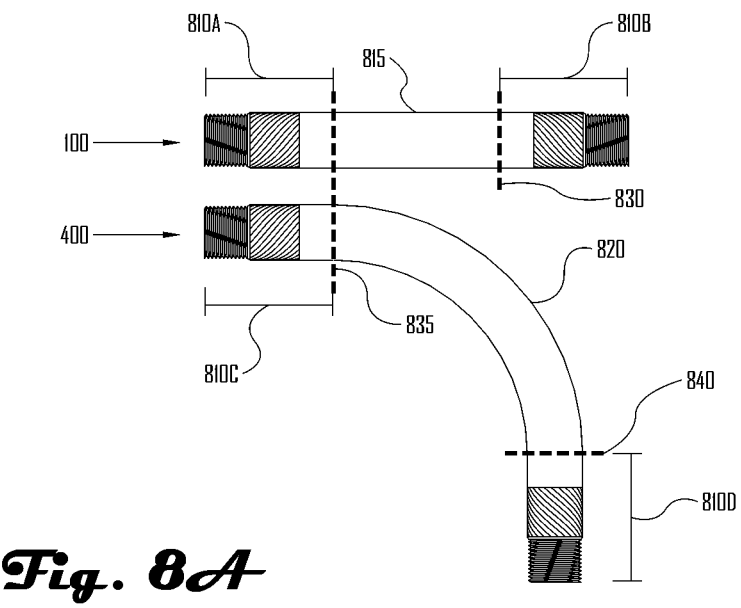
FIG. 8A is a side elevation view of a straight coated conduit and a curved coated conduit, both with demarcations, illustrating the coated conduit end which is common to both the straight and curved coated conduits.

FIG. 8A is a side elevation view of Straight Coated Conduit 100 and Curved Coated Conduit 400. Straight Coated Conduit 100 comprises Coated Conduit Ends 810A and 810B and Central Portion 815, which in this instance is straight. Curved Coated Conduit 400 comprises Coated Conduit Ends 810C and 810D and Central Portion 820, which in this instance is curved. Coated Conduit Ends 810 comprise a demarcation, as discussed above, between an area of Coated Conduit End 810 which is covered by a coated conduit fitting sleeve and an area of Coated Conduit End 810 which is not covered by a coated conduit fitting sleeve. Lines 830, 835 and 840 indicate where Coated Conduit End 810 begins relative to the remainder of the Coated Conduit. As illustrated in FIG. 8A, Central Portion 815 and 820 may be curved or straight or may comprise another geometry; in any case Coated Conduit Ends 810 are consistent, with the bend radius of Central Portion 820 of Curved Coated Conduit 400 beginning after the ends of Conduit Ends 810C and 810D.

Figure 8B:
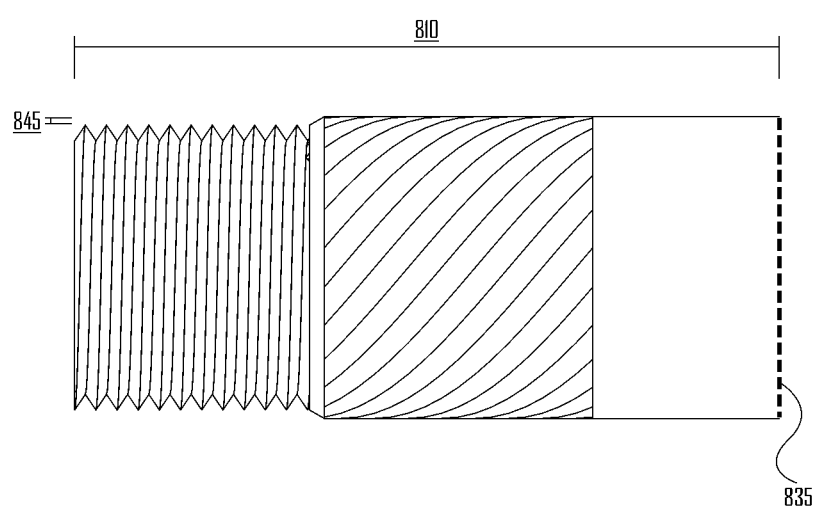
FIG. 8B is a close side elevation view of the coated conduit end and demarcation of FIG. 8A.

FIG. 8B is a close side elevation view of Coated Conduit End 810. The thickness of external coating is indicated at External Coating 845.

Figure 9:
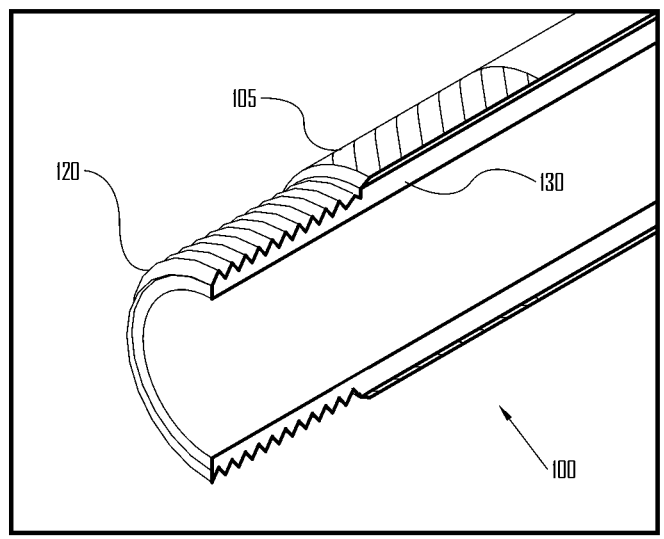
FIG. 9 is a close isometric parallel projection view of a coated conduit end with a section cut along the centerline of the coated conduit end.

FIG. 9 is a close isometric perspective view of Coated Conduit 100 with a section cut along the centerline, illustrating the 3-dimensional structure of Coated Conduit 100.

Figure 10:
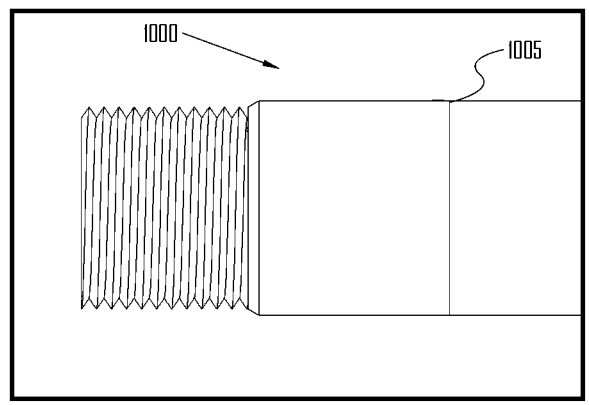
FIG. 10 is a close side elevation view of a coated conduit end, illustrating another example of a demarcation.

FIG. 10 is a close side elevation view of Coated Conduit End 1000, illustrating an example of a demarcation, in this instance, Circumferential Line 1005. Circumferential Line 1005 indicates the portion of Coated Conduit End 1000 which is to be covered by a coating fitting sleeve.

FIG. 11A is a close side elevation view of Coated Conduit End 1100, illustrating another example of a demarcation, in this instance, Raised Circumference 1105. Raised Circumference 1105 indicates the portion of Coated Conduit End 1100 which is to be covered by a coating fitting sleeve.

FIG. 11B is a close side elevation view of Coated Conduit End 1100, with a section cut along the centerline of Coated Conduit End 1100. Relative to FIG. 11A, FIG. 11B illustrates that Raised Circumference 1105 may be created by a wire, thread, cord, O-ring, O-ring compression clamp, or the like at Tactile Structure 1110, which may be positioned at the demarcation and then coated with external coating. In the alternative, the wire, thread, cord, O-ring, a whole or broken O-ring compression clamp, or the like, generally in the same location as Tactile Structure 1110, may be on the exterior of the conduit rather than, as illustrated in FIG. 11B, beneath exterior coating.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling of connection between the elements can be physical, logical, or a combination thereof. Additionally, the words, "herein," "above," "below," and words of similar import, when used in this application, shall refer to this application as a whole and not to particular portions of this application. When the context permits, words in the description using the singular may also include the plural while words using the plural may also include the singular. The word "or," in reference to a list of two or more items, covers all of the following interpretations of the word: any of the items in the list, all of the items in the list, and any combination of one or more of the items in the list.

The above detailed description of embodiments is not intended to be exhaustive or to limit the disclosure to the precise form disclosed above. While specific embodiments of and examples for conduit end are described above for illustrative purposes, various equivalent modifications are possible within the scope of the system, as those skilled in the art will recognize.

The invention claimed is:

1. A conduit system comprising:

a first conduit end including a male threaded portion suitable to be secured to a female threaded coated conduit fitting comprising a sleeve; and a straight portion of coated conduit abutting the threaded portion, which straight portion comprises a perceivable demarcation between a central coated conduit area and a non-central coated conduit area of said straight portion, said non-central coated conduit area dimensioned so that the sleeve of the female threaded coated conduit fitting covers said non-central coated conduit area without covering the central coated conduit area with the male threaded portion secured to a female threaded receptacle of the female threaded coated conduit fitting comprising the sleeve.

2. The conduit system of claim 1, further comprising a second conduit end, substantially similar to the first, which first and second conduit ends are attached by a central conduit span that includes said central coated conduit area.

3. The conduit system of claim 2, wherein the central conduit span is straight.

4. The conduit system of claim 2, wherein the central conduit span follows an arc.

5. The conduit system of claim 4, wherein inception of a bend radius of the arc is coincident with inception of the first and second conduit ends distal to the male threaded portion.

6. The conduit system of claim 1, wherein the perceivable demarcation is visible.

7. The conduit system of claim 6, wherein the perceivable demarcation is formed by a first color in said non-central coated conduit area proximate to the threaded portion and a second color in said central coated conduit area distal to the threaded portion.

8. The conduit system of claim 6, wherein the perceivable demarcation is formed by at least one circumferential line.

9. The conduit system of claim 1, wherein the perceivable demarcation is tactile.

10. The conduit system of claim 9, wherein the tactile demarcation is formed by a band about a circumference of the conduit end.

11. The conduit system of claim 10, wherein the band is encased in an external coating.

12. The conduit system of claim 10, wherein the band is external to the conduit end.

13. The conduit system of claim 10, wherein the band is one of a wire, a thread, a cord, an O-ring, and a broken O-ring compression clamp.

14. The conduit system of claim 6, wherein the visible demarcation is formed by a label edge, which label edge is applied to the conduit end at the perceivable demarcation with the label edge perpendicular to a central axis of the conduit end.

15. The conduit system of claim 14, wherein the label indicates conformance with a regulatory standard.

16. The conduit system of claim 1, further comprising the female threaded coated conduit fitting with the sleeve, wherein the male threaded portion is secured to the female threaded receptacle of the female threaded coated conduit fitting and wherein the sleeve of the female threaded coated conduit fitting covers said non-central coated conduit area without covering the central coated conduit area.

17. The conduit system of claim 16, wherein the female threaded coated conduit fitting is a coupling.

18. The conduit system of claim 16, wherein the female threaded coated conduit fitting is a conduit body.

19. A conduit system comprising:

a female threaded coated conduit fitting comprising a sleeve and a female threaded receptacle suitable to be secured to a male threaded portion that abuts a straight portion of coated conduit that comprises a perceivable demarcation between a central coated conduit area and a non-central coated conduit area of said straight portion, wherein said sleeve of the female threaded coated conduit fitting is dimensioned to cover the non-central coated conduit area without covering the central coated conduit area.

20. A first conduit end comprising:

a first conduit end including a male threaded portion suitable to be secured to a female threaded coated conduit fitting comprising a sleeve; and a straight portion of coated conduit abutting the threaded portion, which straight portion comprises a perceivable demarcation between a central coated conduit area and a non-central coated conduit area of said straight portion, said non-central coated conduit area dimensioned so that the sleeve of the female threaded coated conduit fitting covers said non-central coated conduit area without covering the central coated conduit area with the male threaded portion secured to a female threaded receptacle of the female threaded coated conduit fitting comprising the sleeve.

* * * * *